United States Patent [19]

Grönlund

[11] Patent Number: 4,471,175
[45] Date of Patent: Sep. 11, 1984

[54] RAIL-BOUND VEHICLES PROVIDED WITH ELECTRIC CURRENT COLLECTORS

[75] Inventor: Martin Grönlund, Västerås, Sweden

[73] Assignee: Asea Aktiebolag, Västerås, Sweden

[21] Appl. No.: 415,712

[22] Filed: Sep. 7, 1982

[30] Foreign Application Priority Data

Sep. 9, 1981 [SE] Sweden .................. 8105354

[51] Int. Cl.³ .................. B60L 5/18; B61F 5/02
[52] U.S. Cl. .................. 191/66; 105/199 A; 191/74
[58] Field of Search .......... 105/164, 199 R, 199 A, 105/199 F, 453; 191/64, 65, 66, 67, 68, 69, 70, 72, 73, 74; 296/1 S

[56] References Cited

U.S. PATENT DOCUMENTS

| 430,580 | 6/1890 | Hunter | 191/66 |
| 1,828,945 | 10/1931 | Rossman | 191/66 |

FOREIGN PATENT DOCUMENTS

| 327289 | 1/1976 | Austria. | |
| 717539 | 2/1942 | Fed. Rep. of Germany. | |
| 880,873 | 6/1953 | Fed. Rep. of Germany | 191/66 |
| 2526417 | 12/1976 | Fed. Rep. of Germany | 191/72 |
| 2372714 | 8/1978 | France | 191/65 |
| 477305 | 10/1969 | Switzerland. | |
| 541452 | 10/1973 | Switzerland. | |

OTHER PUBLICATIONS

*Modern Railways*, vol. 26, No. 262, Jul. 1970, p. 320, "Swedish Tilting Coach . . . ".

Primary Examiner—Robert B. Reeves
Assistant Examiner—David F. Hubbuch
Attorney, Agent, or Firm—Watson, Cole, Grindle & Watson

[57] ABSTRACT

In a rail-bound vehicle which has a vehicle body which can be tilted in relation to supporting bogies when travelling along curved track sections, a current collector for collecting electric current from an overhead contact line is arranged on transverse guides on the roof of the vehicle body, so that it may be displaced in the lateral direction in relation to the roof upon tilting of the vehicle body. The position of the current collector relative to the vehicle body and the overhead contact line is determined by a mast fixed to one of the supporting bogies, which mast is flexibly connected to the current collector.

1 Claim, 2 Drawing Figures

RAIL-BOUND VEHICLES PROVIDED WITH ELECTRIC CURRENT COLLECTORS

TECHNICAL FIELD

This invention relates to a rail-bound vehicle of the kind comprising a vehicle body with a roof, which body can be tilted in relation to supporting bogies of the vehicle and which has a current collector mounted on the roof for collectng electric current from an overhead contact line, the current collector being displaceable relative to the roof laterally of the vehicle body.

In vehicles of the above-mentioned kind, the current collector must substantially maintain its postion across the rail track center even when the vehicle body tilts and gives rise to a considerable displacement of the roof of the vehicle body in the lateral direction.

BACKGROUND ART

It is known, in vehicles of the kind referred to, to arrange for the current collector to be displaceable in the lateral direction on the vehicle body roof. It can either be displaced so that it remains substantially parallel to itself or it can be swung around a vertical shaft in front of a contact rail of the current collector which runs along the overhead contact line. The current collector is displaced in the lateral direction relative to the vehicle body roof by means of either a rope system, a linkage system, or a hydraulic system which is connected to a bogie of the vehicle. See, for example, Swiss Patent Specification No. 541,452 and Austrian Patent Specification No. 327,289. It is also known to mount the current collector on a mast which is supported by a bogie and projects through the vehicle body (see German Patent Specification No. 717,539). All of the above-mentioned solutions have both advantages and disadvantages. When the current collector is mounted on a mast supported by a bogie, a simple supporting construction is obtained, but the mast passes through the vehicle body close to the longitudinal plane of symmetry of the latter, where it causes an obstruction. A major disadvantage of such a construction is that it supports relatively great masses at a large distance from the bogie. Disturbances to which the bogies are subjected, caused by track faults, are propagated up through the mast and can give rise to lateral oscillations of the current collector which may be difficult to cope with, owing the large damping effect that is required. Considerble torsional oscillations can arise when the current collector is arranged to swing about a vertical shaft. Again, in the known arrangements in which the current collector is movably mounted on the roof of the vehicle body, for example on laterally disposed guides, the current collector has to be connected to the bogie in such a way that it maintains a substantially constant position in relation to the overhead contact rail. The employment of hydraulic systems for effecting this connection has the disadvantage that leakage of the hydraulic fluid may jeopardize the correct control of the position of the current collector. Furthermore, the employment of mechanical linkages and rope systems for effecting this connection has the disadvantage that the equipment becomes relatively complicated.

The present invention has for its object to provide a rail-bound vehicle of the kind referred to which at the same time provides a good maintenance of the position of the current collector relative to the overhead contact line, has a simple means for supporting and guiding the current collector, and the current collector of which has a very reduced risk of developing lateral and torsional oscillations, compared with hitherto known rail-bound vehicles of this kind.

DISCLOSURE OF THE INVENTION

According to the invention, in a rail-bound vehicle comprising a vehicle body with a roof, which body can be tilted in relation to supporting bogies of the vehicle and which has a current collector mounted on said roof for collecting electric current from an overhead contact line, the current collector being displaceable relative to the roof laterally of the vehicle body, the current collector is connected by flexible connection means to a mast fixed to one of the bogies, which mast maintains the current collector substantially in a specified position in relation to the one bogie.

The current collector may be movable in the lateral direction of the roof by means of, for example, rollers running in guide means, or by means of ball bearing running along rods. The flexible connection between the mast and the current collector preferably comprises one or more substantially horizontal links between the mast and a support for the current collector, with the object of eliminating or substantially reducing the effect of the vertical movements that occur between the vehicle body and the bogie to which the mast is fixed.

In a preferred embodiment of the invention, the mast is connected to the current collector by a linkage system, which comprises a substantially vertical link which, at its mid-portion, is flexibly connected to the top of the mast and which has its upper and lower ends connected to one end of a respective one of two substantially horizontal links which, at their other ends, are flexibly connected to the current collector. With this arrangement, it is possible to prevent vertical movement between the bogie to which the mast is fixed and the vehicle body from giving rise to lateral movements of the current collector. A source of disturbance which may give rise to oscillations of the current collector is thus eliminated.

Since, in a rail-bound vehicle in accordance with the invention, the mast only guides the current collector, the mast can have a much lighter construction compared with a mast which actually supports the current collector. In addition, the mast can be placed asymmetrically with reference to the longitudinal plane of symmetry of the vehicle body. This results in the mast being much less of an obstruction than in hitherto known vehicles employing masts. The mast and/or the current collector is/are suitably connected to the vehicle body by means of dampers which counteract lateral oscillations of the current collector and the mast.

BRIEF DESRIPTION OF DRAWING

The invention will be described in greater detail, by way of example, with reference to the accompanying schematic drawing, wherein FIG. 1 is a side view, partly broken away to reveal underlying structure, of one embodiment of a rail-bound vehicle in accordance with the invention, and FIG. 2 is a sectional end view of the vehicle of FIG. 1.

DESCRIPTION OF PREFERRED EMBODIMENTS

Figure 1:
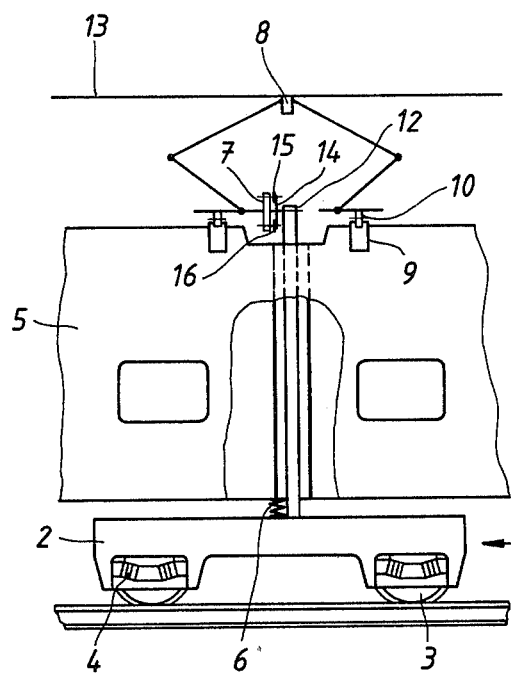
Figure 2:
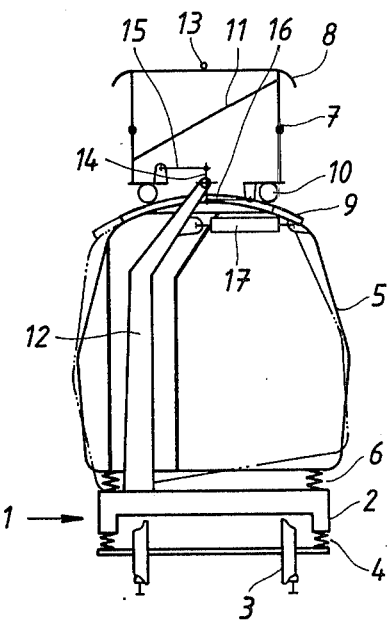

The drawing shows a railroad car comprising a car body 5 supported on bogies 1, only one of which is shown. The bogies 1 comprise a frame 2 supported by a wheel set 3, and between the wheel set 3 and the frame 2 there are springs 4. The car body 5 rests on springs 6, for example air springs of a kind which permit variation of the lifting for tilting of the car body 5 relative to the bogies 1 when the coach runs through a curve. The unbroken contour line in FIG. 2 shows the body 5 in a neutral position, whereas the dash-dotted contour line shows the body 5 in tilted position.

A pantograph support 7 for a current collector 8 is arranged on the roof of the car body 5. Rollers 10 journalled in the support 7 engage in arcuate guides 9 on the roof of the car body 5, so that relative movement, laterally of the car body, can take place between the support 7 and the car body. The support 7 includes stayed constructional elements 11, shown purely schematically, which make the support 7 rigid in the lateral direction of the car body.

A mast 12, mounted on the frame 2 of one of the bogies 1, maintains the current collector 8 in the correct position in relation to an overhead contact line 13. The mast 12 projects the roof of the car body 5, and as its upper end it is connected to the support 7 by means of links 14, 15 and 16. The linek 14 is vertical and is flexibly connected at its mid-portion to the mast 12. The links 15 and 16 are horizontal and are flexibly connected at their ends to the link 14 and to the support 7, respectively. With the arrangement of the connection between the mast 12 and the support 7, the risk of vertical movements of the car body 5 relative to the bogie 1 gving rise to lateral movements of the support 7 is avoided. This eliminates a source of oscillations in the lateral direction of the support 7.

The flexible connections between the links 14, 15 and 16, between the mast 12 and the link 14, and between the links 15, 16 and the support 7 may be pivoted connections having their axes disposed substantially parallel to the longitudinal direction of the car body 5. Alternatively, each of these flexible connections may be constituted by universal ball and socket joints.

The mast 12 is connected to the car body 5 by way of a damper 17. The damper 17 damps lateral oscillations of the mast 12 and the support 7. By giving the mast 12 a suitable lateral rigidity and by virtue of the damping effect of the damper 17, the propagation of disturbances to the support 7, caused by rolling movements of the bogie, can be prevented, so that lateral oscillation of the support 7 is avoided.

What is claimed is:

1. In a rail-bound vehicle comprising a vehicle body with a roof, which body can be tilted in relation to supporting bogies of the vehicle, and which has a current collector mounted on said roof for collecting electric current from an overhead contact line, said current collector being displaceable relative to said roof laterally of the vehicle body, the improvement according to which said current is maintained substantially in a specified position in relation to one of said bogies by a mast fixed to said one of said bogies and connected to the current collector by flexible connection means, said flexible connection means comprising a substantially vertical link which, substantially at its mid-point, is flexibly connected to said mast and two substantially horizontal links which are flexibly connected to said current collector and to said vertical link on either side of the mid-point thereof.

* * * * *